United States Patent [19]
Truskalo

[11] Patent Number: 6,011,527
[45] Date of Patent: *Jan. 4, 2000

[54] CORRECTION OF LINEARITY ERRORS

[75] Inventor: Walter Truskalo, Indianapolis, Ind.

[73] Assignee: Thomson Consumer Electronics, Inc., Indianapolis, Ind.

[ * ] Notice: This patent issued on a continued prosecution application filed under 37 CFR 1.53(d), and is subject to the twenty year patent term provisions of 35 U.S.C. 154(a)(2).

[21] Appl. No.: 08/648,154
[22] PCT Filed: Dec. 22, 1993
[86] PCT No.: PCT/US93/12544
§ 371 Date: May 23, 1996
§ 102(e) Date: May 23, 1996
[87] PCT Pub. No.: WO95/17763
PCT Pub. Date: Jun. 29, 1995
[51] Int. Cl.[7] .................................................... G09G 1/08
[52] U.S. Cl. ................... 345/13; 345/12; 345/14
[58] Field of Search ..................... 315/368, 370; 345/10–15

[56] References Cited

U.S. PATENT DOCUMENTS

| | | | |
|---|---|---|---|
| 4,230,974 | 10/1980 | Haak | 315/399 |
| 4,318,032 | 3/1982 | Kureha | 315/368 |
| 4,516,058 | 5/1985 | Haferl | 315/370 |
| 4,763,040 | 8/1988 | Vink et al. | 313/428 |
| 4,814,671 | 3/1989 | Oguino et al. | 315/368 |
| 4,961,030 | 10/1990 | Ogino et al. | 315/368 |
| 5,223,769 | 6/1993 | Priere et al. | 315/370 |
| 5,361,020 | 11/1994 | Hedrick | 315/369 |

Primary Examiner—Richard A. Hjerpe
Assistant Examiner—Henry N. Tran
Attorney, Agent, or Firm—Joseph S. Tripoli; Joseph J. Laks; Daniel E. Sragow

[57] ABSTRACT

In order to compensate for currents which are induced in a convergence yoke (16) by a deflection yoke (14), a pulse of current is injected into an amplifier (26) which receives the convergence waveform (from 28) so as to correct or compensate for the induced current. One way of generating the compensating pulse is by delaying a horizontal retrace pulse (36).

8 Claims, 3 Drawing Sheets

CORRECTION OF LINEARITY ERRORS

BACKGROUND OF THE INVENTION

The present invention relates to a cathode ray tube system which uses an auxiliary deflection winding for convergence correction. Such an auxiliary convergence correction winding or yoke is commonly used in projection television systems where each one of multiple cathode ray tubes generates a unique color image. When the color images are optically combined, slight correction is necessary in order that the multiple images exactly match.

In some systems, a convergence yoke is positioned close enough to the deflection yoke so that deflection currents are induced in the convergence yoke. Such induced currents in the convergence yoke may cause undesirable deflection of the electron beam. The Applicant has found that such induced currents cause an apparent stretch of the image near the beginning of horizontal scan.

SUMMARY OF THE INVENTION

It is an object of the present invention to provide a cathode ray tube display system in which image distortion, due to currents induced in a convergence correction yoke by the deflection yoke, is corrected.

More specifically, the invention provides a cathode ray tube system which includes a kinescope, a deflection yoke and a correction yoke mounted thereon. The deflection yoke is energized by sawtooth wave currents to generate magnetic fields for scanning an electron beam across the face of the kinescope. The correction yoke, when energized, generates magnetic fields which correct for beam landing errors in the kinescope. Since the correction yoke is affected by stray fields from the deflection yoke, in order to compensate for the effect of the stray fields on the correction yoke, a source of compensation current is fed to the correction yoke near the beginning of a deflection sawtooth wave.

DETAILED DESCRIPTION OF THE PREFERRED EMBODIMENT

Figure 1:
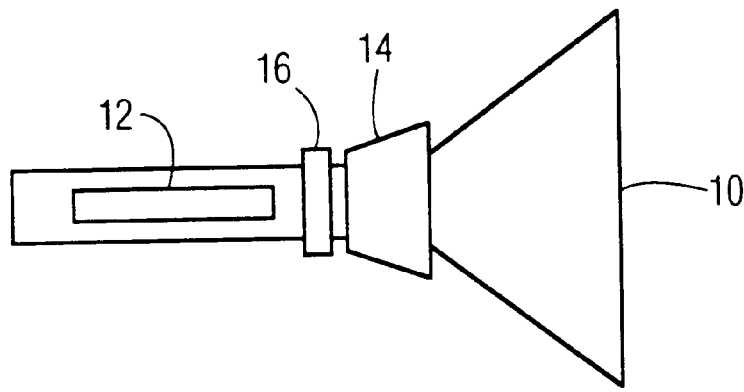
FIG. 1 is a schematic drawing of a cathode ray tube having a deflection yoke and a convergence correction yoke.

FIG. 1 shows a cathode ray tube 10 having an electron gun 12 which generates an electron beam and directs it toward the face of the cathode ray tube. Deflection yoke 14 magnetically scans the beam across the face of the tube while convergence correction yoke 16 corrects for beam landing errors. It is to be noted that convergence correction yoke 16 and deflection yoke 14 are in close proximity, so that stray fields which are generated by deflection yoke 14 tend to induce currents in correction yoke 16.

Figure 2:
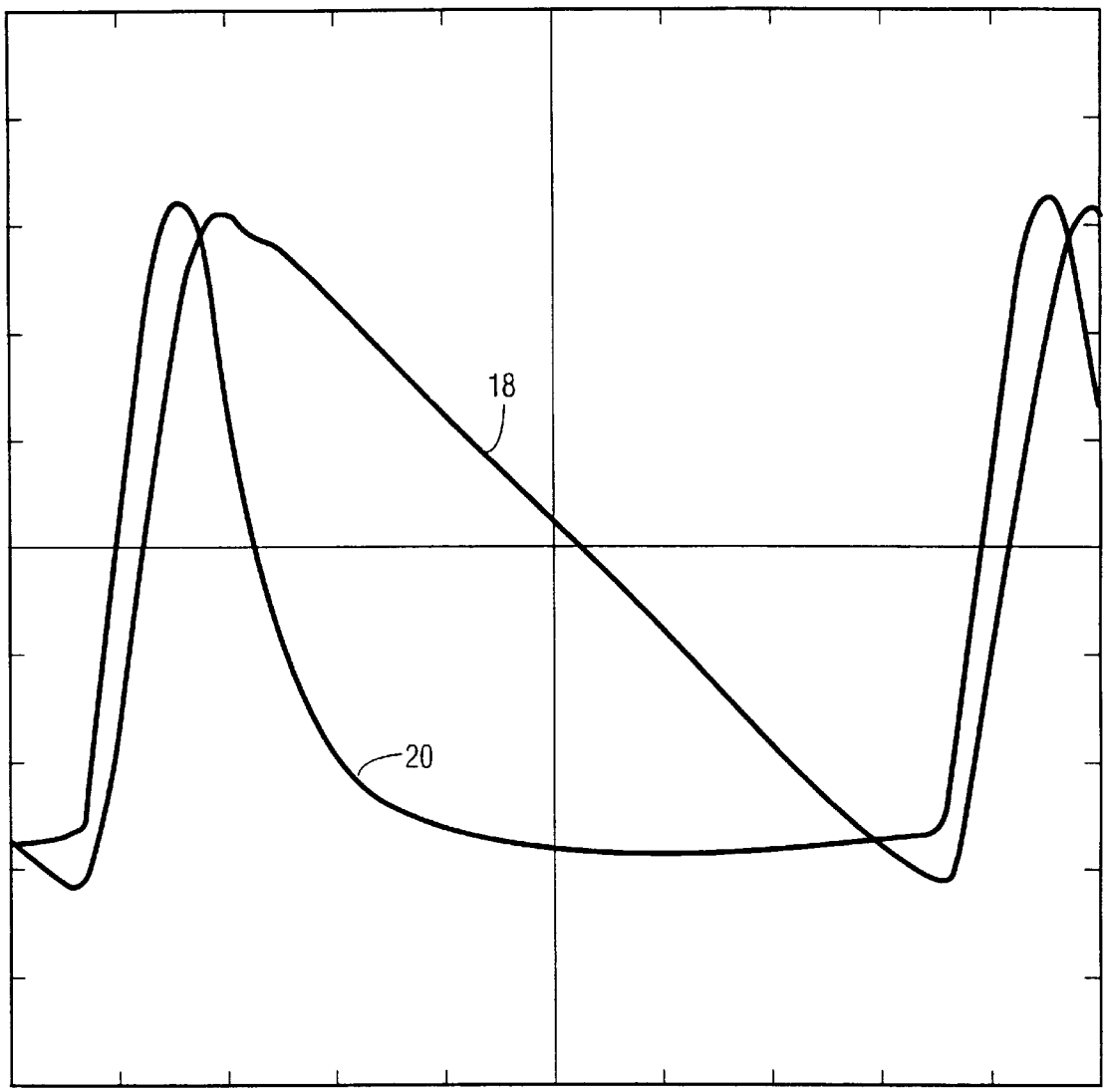
FIG. 2 shows waveform diagrams of the current that is induced in the convergence correction yoke by the horizontal deflection winding for different values of correction yoke winding circuit impedances.

FIG. 2 shows waveforms of the current which is induced in convergence correction yoke 16 by the horizontal deflection field from deflection yoke 14. Curve 18 shows the current which is induced in correction yoke 16 when yoke 16 is terminated by zero impedance (a short circuit). This waveform closely approximates the waveform of the horizontal deflection current. However, when convergence correction yoke 16 is terminated by a 40 ohm impedance, which is the approximate value of the output impedance of the amplifier which drives the convergence correction yoke, the shape of the induced current changes to the shape shown by curve 20. Curve 20 is a pulse occurring at the beginning of horizontal trace and having a duration of about 15% of the horizontal trace interval. The induced current reaches its baseline about 4 microseconds ($\mu$S) after the start of video.

Figure 3:
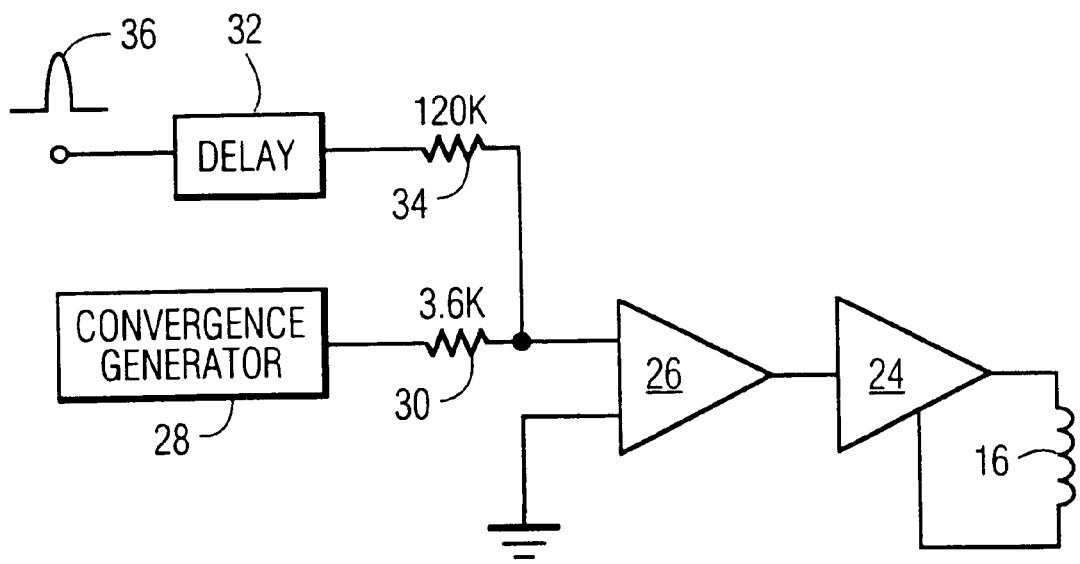
FIG. 3 is a schematic circuit diagram, in block form, of a cathode ray tube display system, according to the invention, which compensates for the currents in the correction yoke which are induced by the deflection yoke.

FIG. 3 shows a schematic diagram, in block form, of a circuit for correcting for the current which is induced in the convergence yoke by the horizontal deflection winding of the deflection yoke. Convergence yoke 16 is driven by power amplifier 24 which is, in turn, driven by signal amplifier 26. Signal amplifier 26 receives a convergence correction waveform from convergence generator 28 through resistor 30. Also fed to the input of the signal amplifier 26 is a pulse signal fed through resistor 34. The input to signal amplifier 26 is therefore the sum of the waveform generated by convergence generator 28 and the pulse waveform which is fed through resistor 34. The pulse waveform which is fed through resistor 34 may be generated by suitably delaying a retrace pulse 36 in delay 32, so that the pulse waveform input to amplifier 26 occurs during the first 4 $\mu$S after the start of video in the horizontal trace interval.

In this way, the undesired current which is induced in the convergence correction yoke 16 by the horizontal deflection winding is compensated or counteracted by the pulse which is fed through resistor 34 to the input of signal amplifier 26.

In order for pulse 36 to counteract or compensate for the current which is induced in convergence yoke 22 by the horizontal deflection winding, the pulse must occur at the beginning of the trace interval. One way of producing a pulse at this time is to feed a retrace pulse 36 through a delay circuit 32 so that the retrace pulse is fed through resistor 34 to the input of amplifier 26 at the beginning of the deflection trace interval. However, it is apparent that other pulse sources may be used.

Figure 4:
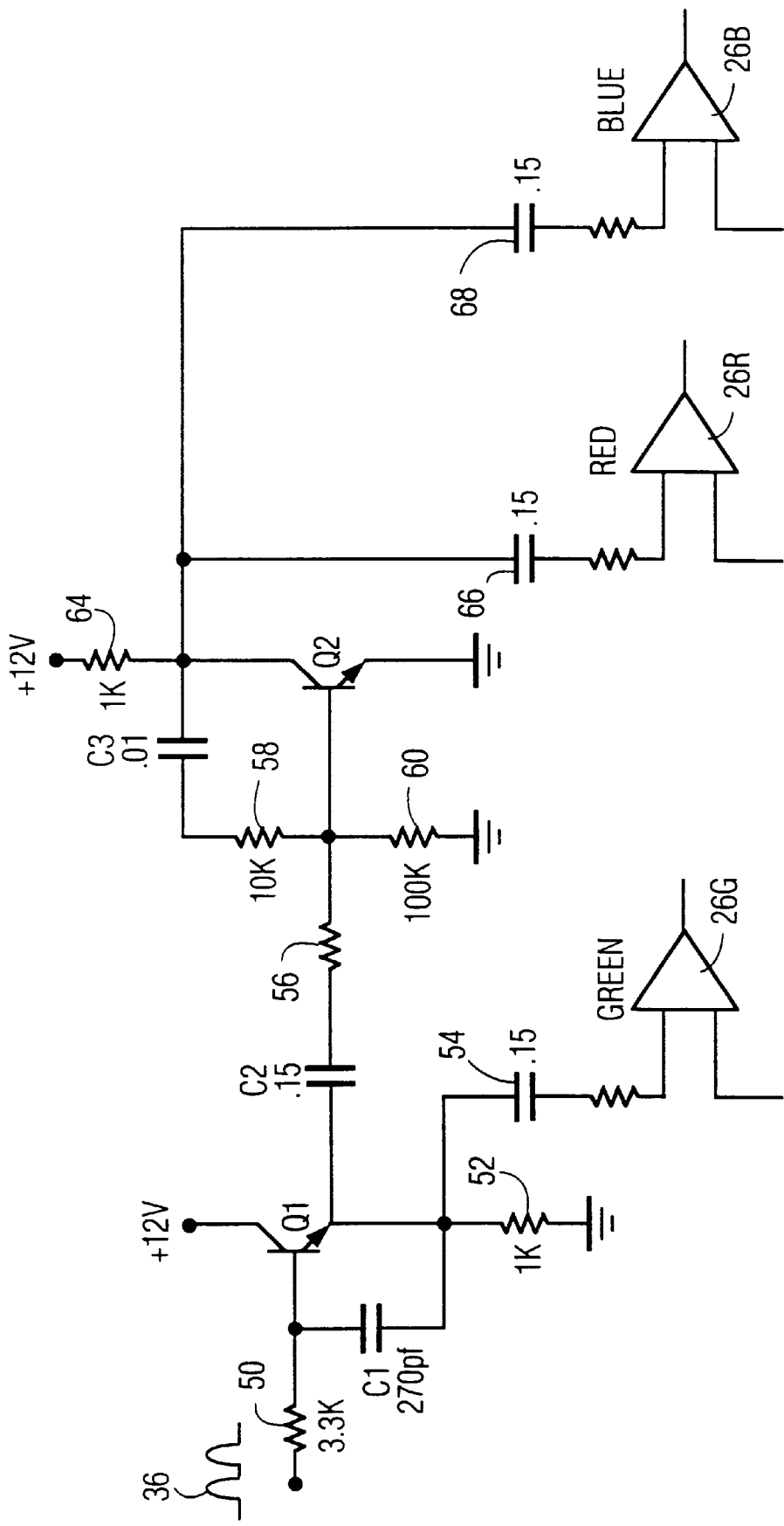
FIG. 4 is a detailed circuit diagram of a correction arrangement for three cathode ray tubes.

FIG. 4 is a circuit diagram of an arrangement for supplying correction current to each of green, red and blue display tubes of a multicolored display system. Flyback pulses 36 are fed through resistor 50 to the base of transistor Q1. Capacitor C1 delays the application of pulses 36 to the base of transistor Q1.

Transistor Q1 acts as an emitter-follower and generates pulses at its emitter which are passed through capacitor C2 and resistor 56 to the base of transistor Q2. Capacitor C2 may be used to control the pulse width. For example, a value of 15 pf will produce a narrow pulse.

Capacitor C3 acts as a feedback path from collector-to-base of transistor Q2, in order to improve the trailing edge timing stability.

The output pulse for the red and blue kinescopes is taken from the collector of transistor Q2 to signal amplifiers 26R and 26B. Pulses for the green kinescope are of the opposite polarity, and are therefore taken from the emitter of transistor Q1 to signal amplifier 26G.

I claim:

1. A cathode ray tube display system including a kinescope, a deflection yoke and a correction yoke mounted thereon, said deflection yoke being energized by horizontal and vertical sawtooth wave currents to generate magnetic fields during trace intervals for scanning an electron beam across a face of said kinescope, said correction yoke, when energized, generating magnetic fields which correct for beam landing errors in said kinescope, said correction yoke being affected by stray fields from said deflection yoke; wherein, in order to compensate for the effect of said stray fields on said correction yoke, said system comprises means for passing a pulse of compensation current through said correction yoke during a trace interval near the beginning of a deflection sawtooth wave.

2. A display system as defined by claim 1, in which said current pulse is generated in response to a deflection retrace pulse.

3. A display system as defined by claim 2, in which said deflection retrace pulse is coupled to said correction yoke through a delay means.

4. A display system as defined by claim 3, in which said delay means comprises a transistor and a capacitor, said capacitor coupled from base to emitter of said transistor.

5. A display system as defined by claim 4, in which said transistor is connected as an emitter follower, the emitter of said transistor being coupled to said correction yoke.

6. A display system as defined by claim 4, in which the emitter of said transistor is coupled to the base of a second transistor, the collector of said second transistor being coupled to a second correction yoke.

7. A display system as defined by claim 1, in which said compensation current is fed to said correction yoke near the beginning of a horizontal deflection sawtooth wave.

8. A display system as defined by claim 1, in which said current pulse is generated in response to a horizontal deflection pulse.

* * * * *